(12) United States Patent
Kelly et al.

(10) Patent No.: US 7,336,967 B2
(45) Date of Patent: *Feb. 26, 2008

(54) METHOD AND SYSTEM FOR PROVIDING LOAD-SENSITIVE BANDWIDTH ALLOCATION

(75) Inventors: Frank Kelly, Walkersville, MD (US); Gabriel Olariu, Gaithersburg, MD (US); Douglas Dillon, Gaithersburg, MD (US); Jack Rozmaryn, Silver Spring, MD (US)

(73) Assignee: Hughes Network Systems, LLC, Germantown, MD (US)

(*) Notice: Subject to any disclaimer, the term of this patent is extended or adjusted under 35 U.S.C. 154(b) by 789 days.

This patent is subject to a terminal disclaimer.

(21) Appl. No.: 10/613,876

(22) Filed: Jul. 3, 2003

(65) Prior Publication Data

US 2004/0008726 A1 Jan. 15, 2004

Related U.S. Application Data

(60) Provisional application No. 60/394,920, filed on Jul. 8, 2002.

(51) Int. Cl.
*H04J 7/16* (2006.01)
*H04J 7/28* (2006.01)
*H04Q 7/00* (2006.01)
*H04B 7/212* (2006.01)

(52) U.S. Cl. ............... 455/468; 370/329; 370/341; 370/348; 370/442

(58) Field of Classification Search ...................... 370/395.5–395.54, 395.3, 395.31, 395.32, 370/347–350, 395.4, 395.41, 395.42, 395.43, 370/442–445, 458–463, 468–480, 901–916, 370/229–235, 395.2–395.21, 328–338, 230.1, 370/231–238, 276–282, 293–295, 314–326, 370/465, 341, 447, 543–544, 431, 437; 455/427–431, 455/453–455, 450–451, 12.1, 560–561, 13.2, 455/452.1, 452.2, 464, 509, 514, 550.1, 556.2; 375/94–99

See application file for complete search history.

(56) References Cited

U.S. PATENT DOCUMENTS

| | | | | |
|---|---|---|---|---|
| 5,745,836 A * | 4/1998 | Williams | .................... | 725/125 |
| 5,982,761 A * | 11/1999 | Dutta | .................... | 370/337 |
| 6,041,233 A * | 3/2000 | Rosati | .................... | 455/427 |
| 6,208,873 B1 * | 3/2001 | Black et al. | ............... | 455/522 |
| 6,219,343 B1 * | 4/2001 | Honkasalo et al. | ......... | 370/335 |
| 6,519,233 B1 * | 2/2003 | Gutierrez | .................... | 370/320 |
| 6,904,265 B1 * | 6/2005 | Valdivia et al. | ............ | 455/12.1 |
| 6,925,070 B2 * | 8/2005 | Proctor, Jr. | ................ | 370/335 |
| 7,054,286 B2 * | 5/2006 | Ertel et al. | ................... | 370/329 |
| 7,116,682 B1 * | 10/2006 | Waclawsky et al. | ........ | 370/468 |
| 7,133,395 B2 * | 11/2006 | Simonsen et al. | ......... | 370/345 |
| 2003/0198184 A1 * | 10/2003 | Huang et al. | .............. | 370/231 |

* cited by examiner

Primary Examiner—Meless Zewdu
(74) Attorney, Agent, or Firm—Bell, Boyd & Lloyd

(57) ABSTRACT

An approach is provided for managing bandwidth in a data network. Capacity is allocated on a communication channel, which can be utilized for transporting data traffic or support network administrative functions (e.g., ranging), for a terminal to transmit data over the communication channel. In anticipation of the terminal having to transmit additional data, additional capacity is allocated on the communication channel for the terminal prior to receiving a request for bandwidth by the terminal. The anticipatory allocation is determined according to loading of the data network. This approach as particular applicability to shared capacity systems, such as a satellite communication system.

18 Claims, 14 Drawing Sheets

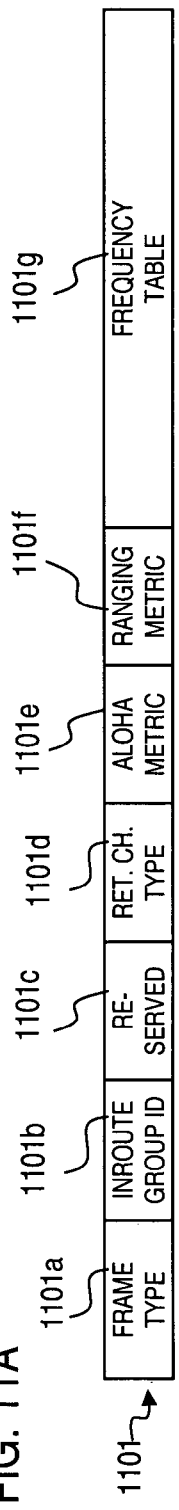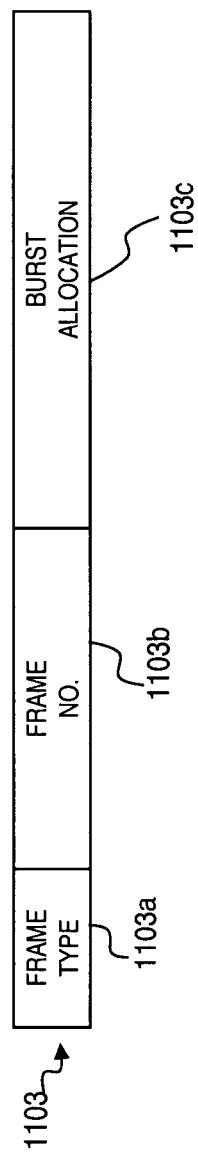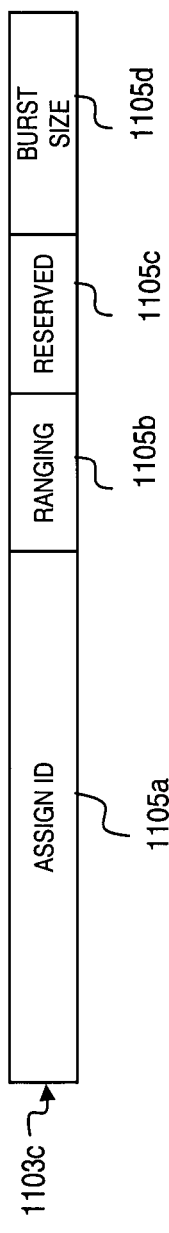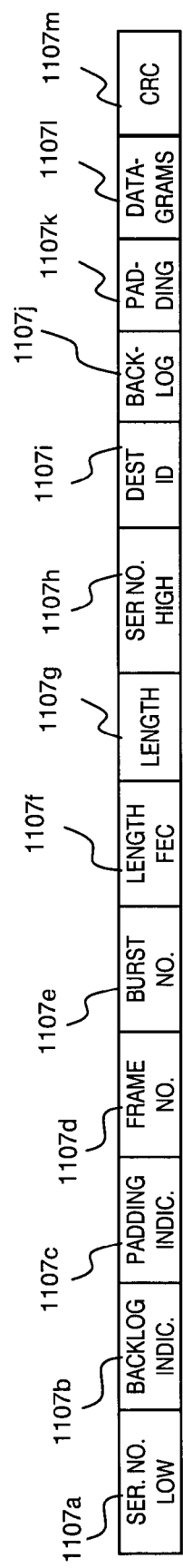

METHOD AND SYSTEM FOR PROVIDING LOAD-SENSITIVE BANDWIDTH ALLOCATION

RELATED APPLICATIONS

The present application is related to and claims the benefit of the earlier filing date of U.S. Provisional Patent Application (Ser. No. 60/394,920), filed on Jul. 8, 2002 and entitled "Load-Sensitive ALOHA Sizing and Load-Sensitive 'Holdover' Time"; the contents of which are hereby incorporated by reference.

FIELD OF THE INVENTION

The present invention relates generally to a communications system, and is more particularly related to managing bandwidth.

BACKGROUND OF THE INVENTION

The maturity of electronic commerce and acceptance of the Internet as a daily tool by a continually growing user base of millions of users intensify the need for communication engineers to develop techniques for enhancing network performance. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements from the network infrastructure. Therefore, this continual demand provides the impetus for continued investigation into achieving higher performing, more efficient communication networks.

Consequently, service providers have invested heavily in upgrading their networks to increase system capacity (i.e., bandwidth). In many circumstances, such upgrades may not be feasible economically or the physical constraints of the communication system do not permit simply "upgrading." This is the case, for example, in radio communication systems such as satellite networks. Accordingly, service providers have also invested in developing techniques to optimize the performance of their networks by efficiently managing precious bandwidth.

Modern satellite communication systems provide a pervasive and reliable infrastructure to distribute voice, data, and video signals for global exchange and broadcast of information. These satellite communication systems have emerged as a viable option to terrestrial communication systems, particularly in the arena of Internet access. As the popularity of the Internet continues to grow in unparalleled fashion, the communication industry has focused on improving user response time. Although satellite based Internet service addresses the problem of providing universal Internet access in that satellite coverage areas are not hindered by traditional terrestrial infrastructure obstacles, the deployment of satellite based access services is tempered by the challenges of minimizing delay and increasing throughput in a bandwidth constrained system.

Based on the foregoing, there is a clear need for improved approaches for managing bandwidth in bandwidth constrained systems, while minimizing user response time.

SUMMARY OF THE INVENTION

The present invention addresses the above stated needs by adjusting bandwidth allocations on a contention channel, which can be utilized for transporting data traffic or support network administrative functions (e.g., ranging), by taking into account the dynamic nature of the system load. According to one embodiment of the present invention, a network element (or terminal) is allocated bandwidth (at the request of the network element) when there is data to transmit and until the backlog of traffic is processed. Further, the network element continues to receive bandwidth allocations (denoted "anticipatory bandwidth") for a predetermined duration after the backlog is reduced in anticipation of new traffic, without incurring the overhead associated with the request/allocation cycle. The predetermined period—i.e., "holdover" time, can be dynamically adjusted to account for the system loading. In addition, the size of the anticipatory bandwidth allocation can be altered based on the determined system loading. The above approach advantageously supports more efficient utilization of bandwidth under various loading conditions by allocating bandwidth in a manner that increases overall system throughput.

According to one aspect of an embodiment of the present invention, a method for managing bandwidth in a data network is disclosed. The method includes allocating capacity on a communication channel for a terminal to transmit data over the communication channel. In anticipation of the terminal having to transmit additional data, the method further allocates additional capacity on the communication channel for the terminal. The anticipatory allocation is determined according to loading of the data network.

According to another aspect of an embodiment of the present invention, a system for managing bandwidth in a data network is disclosed. The system includes a relay station configured to support transmission of data over a communication channel. The system also includes a hub configured to allocate capacity on the communication channel for a terminal to transmit the data over the communication channel. In anticipation of the terminal having to transmit additional data, the hub further allocates additional capacity on the communication channel for the terminal, the anticipatory allocation being determined according to loading of the data network.

According to another aspect of an embodiment of the present invention, an apparatus for managing bandwidth in a data network is disclosed. The apparatus includes means for allocating capacity on a communication channel for a terminal to transmit data over the communication channel. In anticipation of the terminal having to transmit additional data, the apparatus also includes means for further allocating additional capacity on the communication channel for the terminal. The anticipatory allocation is determined according to loading of the data network.

In another aspect of an embodiment of the present invention, a method for managing bandwidth in a bandwidth constrained two-way radio communication system is disclosed. The method includes detecting an active terminal in the communication system. The method also includes allocating bandwidth on a return channel to receive data from the active terminal in response to the detected active terminal. Further, the method includes providing subsequent bandwidth allocations on the return channel for anticipated traffic from the terminal based on the loading of the communication system. The bandwidth allocations are adjusted according to one of duration of the subsequent bandwidth allocations and size of the bandwidth allocations.

In yet another aspect of an embodiment of the present invention, a method for managing bandwidth in a two-way radio communication system including a plurality of terminals is disclosed. The method includes allocating a number of slots on a contention channel to one of the terminals for transmission of traffic from the one terminal. The method also includes determining the loading of the radio communication system. The method further includes adjusting the number of slots on the contention channel for the one terminal according to the determined loading of the radio communication system.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 11A-11C are diagrams of the structures of exemplary packets used in the system of FIG. 1;

DESCRIPTION OF THE PREFERRED EMBODIMENT

A system, method, and software for managing bandwidth in a data network is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to a satellite communication system that supports data networking, it is recognized by one of ordinary skill in the art that the present invention has applicability to other data networks (e.g., terrestrial networks and radio communication systems).

Figure 1:
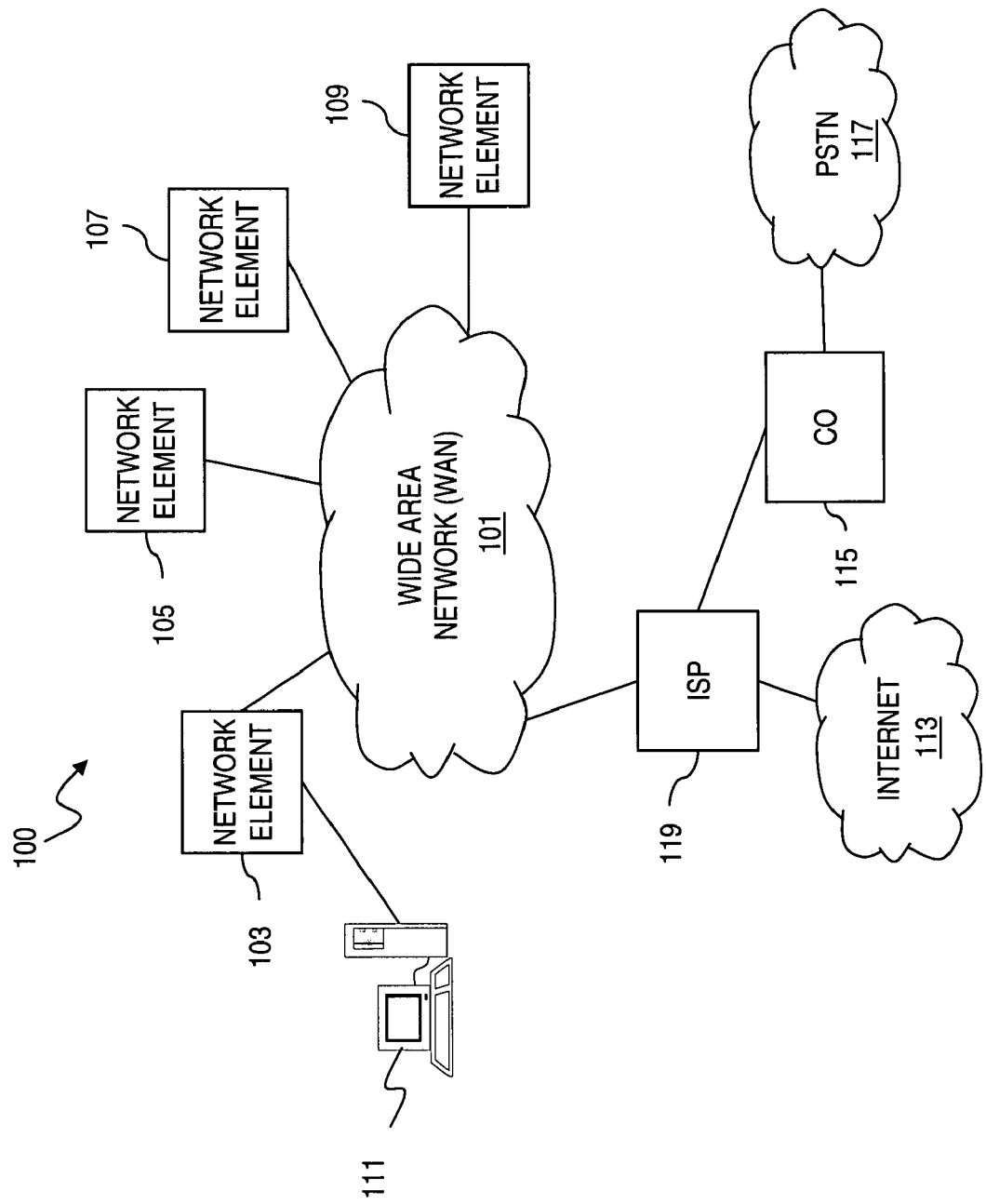
FIG. 1 is a diagram of a communication system capable of managing channel bandwidth allocations, according to an embodiment of the present invention.

FIG. 1 is a diagram of a communication system capable of managing channel bandwidth allocations, according to an embodiment of the present invention. A communication system 100 includes a shared capacity network, shown in this exemplary embodiment, as a wide area network (WAN) 101, which is maintained by a service provider (e.g., carrier). The network 101 provides connectivity for a number of network elements 103, 105, 107, 109 to a public data network, such as the Internet 113. The WAN 101 serves as an infrastructure for supporting, for example, broadband services to users (e.g., host 111) connected to the network element. As will be more fully described later, the users of this shared capacity system 100 compete for resources of the WAN 101, whereby the system 100 ensures that throughput and bandwidth efficiency is preserved during all periods of operation, from non-peak to peak hours, without negatively affecting response time.

The network elements 103, 105, 107, 109 may be any type of networking device that supports user access to the WAN 101 for receipt of the broadband services; for example, cable modems, Digital Subscriber Line (DSL) modems, Very Small Aperture Terminals (VSATs), router, bridge, or a combination thereof. In this example, a Central Office (CO) 115 relays traffic originated from the public switched telephone network (PSTN) 117 to the Internet 113 via an Internet Service Provider (ISP) 119.

Therefore, the WAN 101 may be any type of network, such as a radio communication system (e.g., satellite network, a digital cellular network, a packet radio network, a microwave network, etc.) or a terrestrial network (e.g., an Asynchronous Transfer Mode (ATM) network, frame relay network, etc.). Further, the WAN 101 may utilize any number of topologies—e.g., a fully meshed topology (i.e., connectivity).

The system 100, according to one embodiment of the present invention, supports a bandwidth allocation scheme in which the network elements 103, 105, 107, 109 are dynamically assigned bandwidth over the WAN 101 based upon the amount of traffic that the respect network elements 103, 105, 107, 109 have to transmit. This bandwidth allocation approach is particularly useful when the WAN 101 is an asymmetric system (e.g., Asymmetric Digital Subscriber Line (ADSL) network, cable modem system, two-way satellite system, etc.) which distinguishes between data rates necessary to support traffic originating from the network elements 103, 105, 107, 109 (i.e., inroute or return channel) and traffic that is destined for these network elements 103, 105, 107, 109 (i.e., outroute). The specific bandwidth allocation scheme is designed to ensure maximum bandwidth efficiency (i.e., minimal waste due to unused allocated bandwidth), and minimum delay of return channel data, as described with respect to FIGS. 3-10. The scheme is be tunable, according to the mixture, frequency, and size of user traffic.

Additionally, the bandwidth allocation scheme can be fine tuned, such that the scheme continues to allocate bandwidth even after the backlog of traffic has been satisfied in anticipation of new traffic, as to avoid the need to incur the response time impact of waiting for the new allocation. This allocation (i.e., "periodic bandwidth") can be supported by designating a low-speed connection over the WAN 101 to accommodate light traffic. In other words, periodic bandwidth is provided to the network elements 103, 105, 107, 109 that have recently transmitted but now have no data to send. The intent of this periodic bandwidth is to ensure that small packets can transmit quicker than the bandwidth request cycle of one WAN delay. Such delay is more prominent, and thus a concern, in radio systems, such as satellite networks.

The scheme, according to one embodiment of the present invention, is further refined based on traffic load of the system 100. Because the user is provided with a low-speed pipe, the system 100 has the capability to adjust the size of the periodic allocation by decreasing the allocation during peak hours, for instance, to ensure that the response time for light (or small) traffic continues to be reasonable even under high system load. This approach can decrease the delay for 90% of the packets through the system 100 during peak busy hours.

Although the present invention has applicability to a variety of networks, including wireless and terrestrial systems, bandwidth management is of particular concern in a satellite communication system because of the engineering challenges associated with increasing system capacity. Therefore, for the purposes of explanation, the bandwidth allocation scheme of FIGS. 3-10 is described with respect to a satellite communication system, as shown in FIG. 2.

Figure 2:
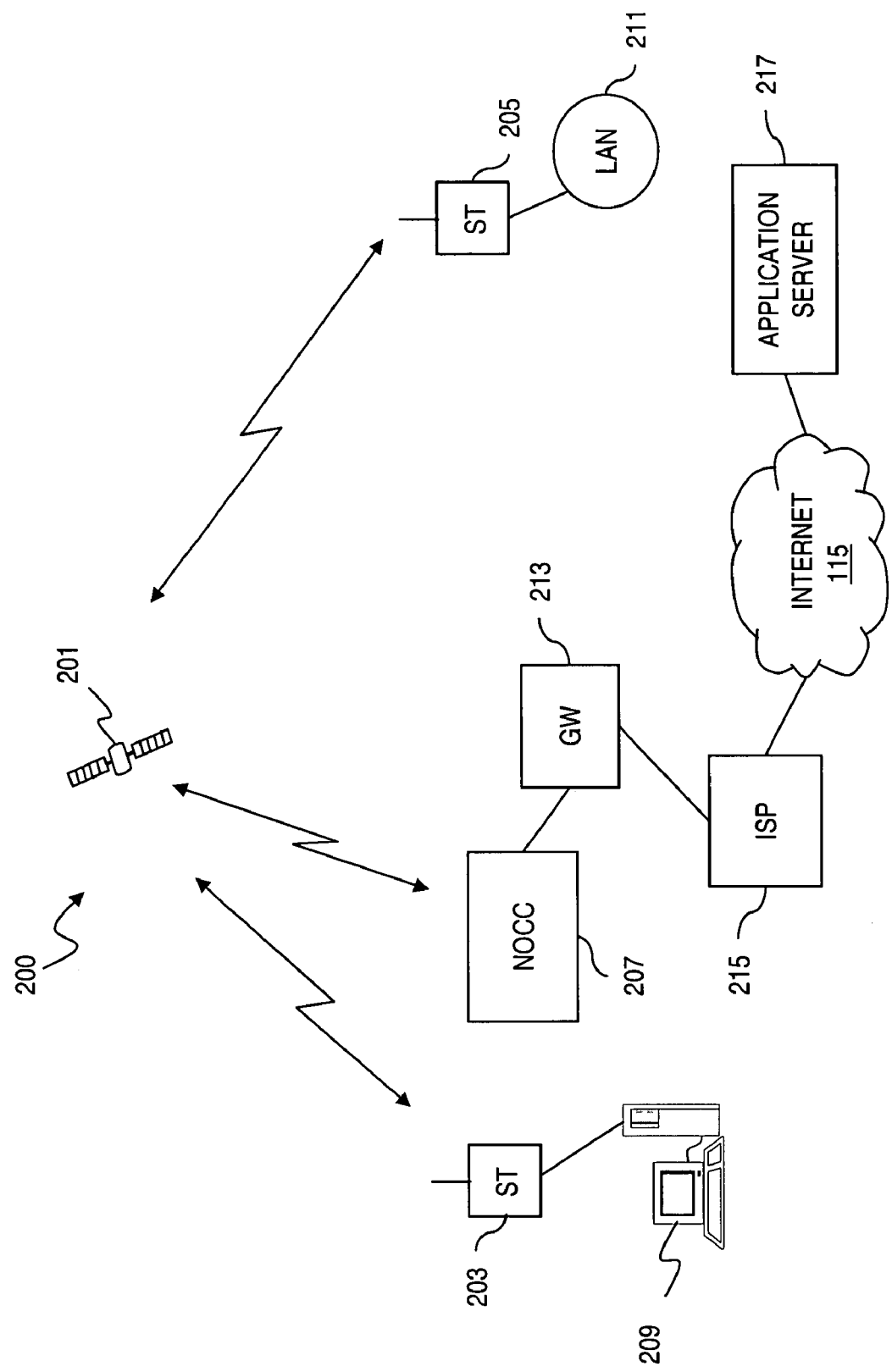
FIG. 2 is a diagram of a satellite communication system capable of managing return channel bandwidth, in accordance with an embodiment of the present invention.

FIG. 2 is a diagram of a satellite communication system capable of managing return channel bandwidth, in accordance with an embodiment of the present invention. The system of FIG. 2 illustrates a specific implementation of the system of FIG. 1, in which the WAN 101 is a satellite network and the network elements 103, 105, 107, 109 are in form of satellite terminals. A satellite communication system 200 utilizes a satellite 201 to transmit information to satellite terminals (STs) 203, 205, and a Network Operations Control Center (NOCC) 207.

In an exemplary embodiment, the STs 203, 205 are Very Small Aperture Terminals (VSAT). The satellite 201 performs the necessary bandwidth control functions, in conjunction with the NOCC 207. In the system 200, the STs 203, 205 originate traffic from a particular coverage area and may exchange data among the other STs (not shown).

The system 200, according to one embodiment of the present invention, supports a two-way satellite access mechanism to the Internet 115 through the use of a Time Division Multiple Access (TDMA) structured inroutes to provide a return channel between the host 209 via the ST 203 and the NOCC 207. For example, the system 200 transmits a burst time plan to the terminals 203, 205 every frame. The burst time plan can be limited in size for a specific inroute group on the system 200.

As a hub station, the NOCC 207 manages and controls communication services and operations. For example, the NOCC 207 provisions and identifies the communication channels that are to be allocated. Additionally, the NOCC 207 is responsible for controlling the bandwidth that is made available to the STs 203, 205. As seen in FIG. 2, the NOCC 207 also provides interfaces, such as a gateway 213, to either private Intranets (not shown) or the public Internet 113 via an ISP 215. The NOCC 207 can support multiple receive channels (referred to as outroutes) and multiple return channels; however, the NOCC 207 can be configured to provide no return channels, depending on the application. That is, the receive support communication from the NOCC 207 to the STs 203, 205, while the return channels (if available) provide communication from the STs 203, 205 to the NOCC 207. For example, the host 209 of the ST 203 can download content from an application server 217 off the Internet 113. Depending on the content, the outroutes from the NOCC 207 to the ST 203 can be heavily utilized.

The system 200 also supports a "ranging" process which may be initiated by the NOCC 207, whereby when the terminal (e.g., terminal 203) is configured with respect to timing and power for proper operation. When terminal 203 acquires transmit timing and is requested, for example, by the host 209 to range, the terminal 203 requests a ranging transmission by sending a message over the ranging burst using some default amount of power after some random number of frame backoffs. If no response is received and the burst is still available, terminal 203 may increase power and try again.

Once the ranging response is received from the NOCC 207, the terminal 203 may start sending ranging data every frame; this data may include the frame number. Next, terminal 203 adjusts ranging time and power based on NOCC response and continues to adjust until terminal 203 is within a predetermined tolerance. The terminal 203 then stores the values when ranging is successful. The terminal 203 then enables normal transmission mode.

As noted the NOCC 207 is capable of requesting a terminal to enter ranging mode. When the terminal 203 does enter this mode, the terminal employs the ranging burst it has been assigned. The terminal 203 may transmit normal traffic (or a small fill-type packet) to the NOCC 207. The NOCC 207 may adjust the timing and power for the site. These adjustments may be stored if the NOCC 207 indicates a successful re-range of the terminal.

The return channels on an NOCC 207, according to an embodiment of the present invention, may support frequency hopping to provide increased efficiency of system 200. A subset of return channels may be configured to support a contention protocol, such as ALOHA. It should be noted that any equivalent contention protocol may be utilized in system 100. A receiver may randomly select a return channel with ALOHA slots. In turn, the NOCC 207 may assign the receiver a stream on the same or a different return channel. The NOCC 207 may change the frequency for the assigned stream when the site requires additional bandwidth, when another site requires additional bandwidth on the same return channel, or when the site may be used for a poll response on another return channel to keep the NOCC 207 locked for the return channel. During normal operation, a return channel (or inroute) is considered locked if at least one burst has been received in the recent past.

A terminal 203 on the system 200 may have bandwidth allocated in one of the following three states. In the first state, if the terminal 203 has not transmitted traffic for a period of time, then the terminal 203 may be inactive. When inactive, the terminal 203 may use ALOHA to send initial traffic to the NOCC 207. The second state is when the terminal 203 is active. In this state, a periodic stream is setup for the terminal 203. The periodic stream, in an exemplary embodiment, can be of a low data rate (e.g., at 1 kbps) as to be sufficient to handle Transmission Control Protocol (TCP) acknowledgements. In the third state, the transmit backlog of the terminal 203 exceeds a predetermined value, in which additional bandwidth is provided. Additional bandwidth allocations are supplied until the maximum is attained or the backlog begins to decrease.

The system 200 utilizes, in an exemplary embodiment, a small number of return channels that are full of slotted ALOHA slots. These slots may be sized to handle the normal first transmission from a terminal 203. When an ALOHA burst is received, the terminal 203 is assigned periodic bandwidth. The bandwidth is given an inactivity timeout value in seconds. When a receive packet indicates that the backlog is greater than a configured amount, additional bandwidth may be provided to ensure that the data can be transmitted within a configured amount of time, if sufficient bandwidth exists. This may require switching the terminal to another return channel.

The bandwidth allocation process of system 200 ensures, when possible, that only the periodic bandwidth users are moved to another frequency. This allows the high-throughput users to transmit with no single frames of downtime (which are required if the site must switch frequencies). When possible, the bandwidth is allocated to ensure that user traffic backlog is reduced within a certain number of frames. The total backlog above the amount needed for additional bandwidth is determined. The NOCC 207 determines if the requested bandwidth can be met within the number of frames. If so, the bandwidth is allocated as needed; if not, then the NOCC 207 starts by limiting the bandwidth for those users with the largest backlog, as more fully described below.

The system 200 can support various types of ALOHA schemes. A pure-ALOHA system assumes that a packet is randomly transmitted in a slot when data transmission is requested. The standard efficiency of a pure-ALOHA system is 7%; thus, when over 7% of the system is loaded, there may be a high number of retransmits necessary, making the response time delays too long. A diversity ALOHA system is an adjustment to the pure-ALOHA system in that every packet to be sent is sent multiple times. This channel becomes 14% efficient. An ALOHA/Periodic stream technique is based upon the concept of being able to forecast the type of traffic an active user may be transmitting over the return channel. For the forecasted traffic (which occurs a majority of the time), the user may have non-collision bandwidth available. When the traffic requirements exceed the forecasted level, the user may be provided with additional allocated bandwidth.

An ALOHA/Periodic Stream—PLUS technique builds upon the above ALOHA-based concepts. Some of the capabilities that are provided in addition to the periodic stream are as follows: load balancing and minimal delay. The traffic is balanced to ensure that non-busy users (those not requiring additional bandwidth) are equally loaded on all return channels that support the streams.

The system 200 supports a minimal delay approach, which relies on equally dividing all bandwidth, other than that used for users requiring additional bandwidth, among all other active users. A minimum rate may be ensured for each user so other users may be unable to request additional bandwidth if every site does not have the minimum amount of bandwidth. This approach provides optimal results when the return channels are lightly loaded. As users become active, they are assigned to the return channels with the fewest number of users which leads to automatic load balancing.

In addition, some minimal burst size is defined for the per-user burst. This size results in a maximum number (denoted as M) of bursts per frame (which may be 3 (120 byte)-5 (71 bytes)) depending on the frame analysis. By way of example, on a given return channel, it is assumed that there are 357 burst bytes per frame time, which may be at least two bursts of traffic. As users are assigned to the return channel, they are provided bandwidth according to Table 1, below.

TABLE 1

| No. of Users | Burst/frame | Approximate Rate |
| --- | --- | --- |
| 1 user | Two bursts/frame | 90% |
| 2 users | One burst/frame | 45% |
| 3–M users | One burst/frame | [0.90/(3 − M)] × 100% |
| M + 1–2 M users | One burst/frame | [0.90/(M + 1–2 M)] × 100% |
| 2 M + 1–4 M users | One burst/frame | [0.90/(2 M + 1–4 M)] × 100% |

Figure 3:
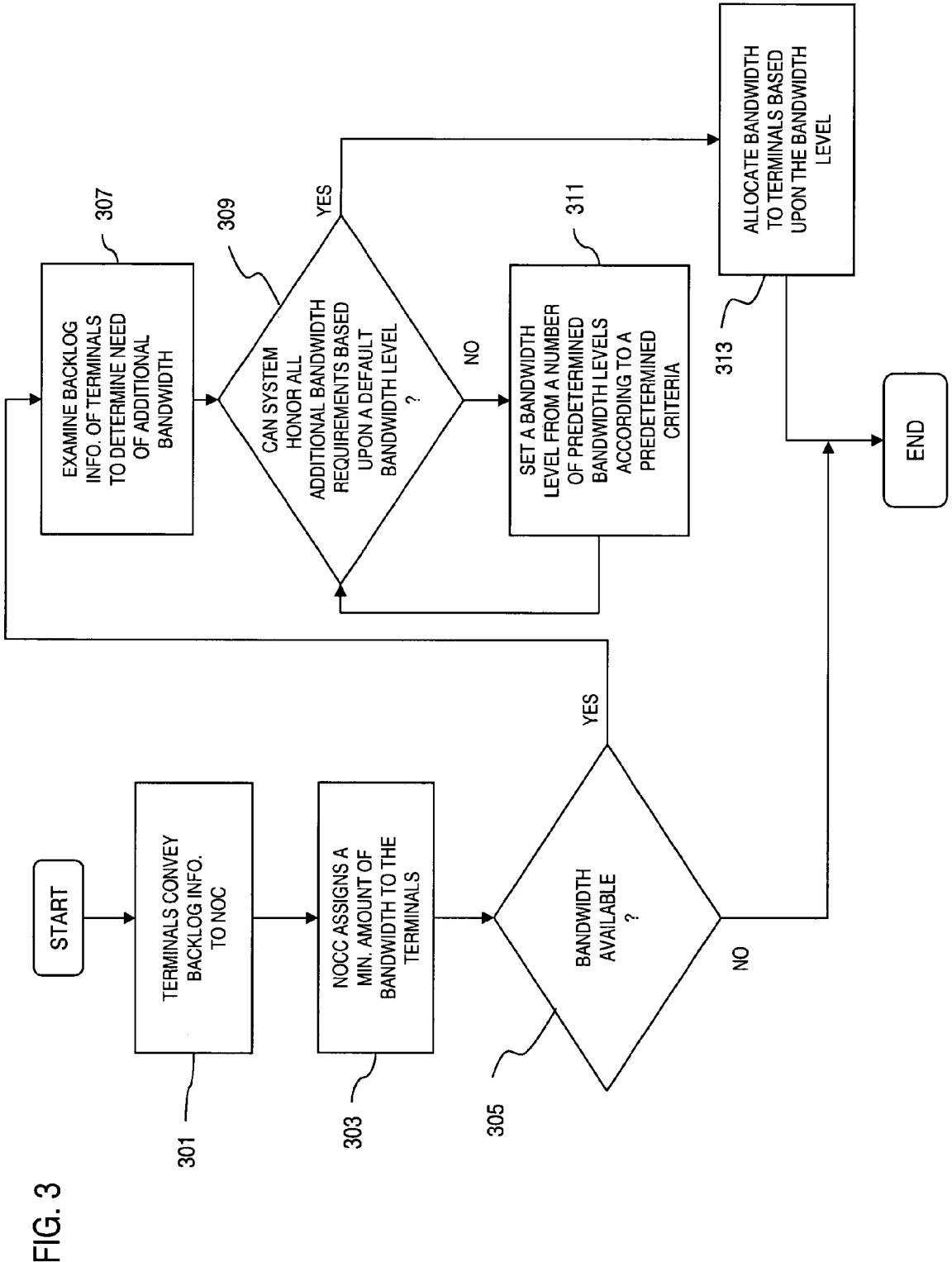
FIG. 3 is a flow chart of a return channel bandwidth allocation process utilized in the system of FIG. 1.

FIG. 3 is a flow chart of a return channel bandwidth allocation process utilized in the system of FIG. 1. This process essentially limits the ability for a terminal to monopolize the return channel bandwidth, thereby maintaining fairness. In an exemplary embodiment, the total bandwidth allocated to a specific user may be limited by a fixed amount of bandwidth every frame.

In step 301, the terminals 203, 205 provide the NOCC 207 with information on the amount of backlog (i.e., buffered traffic) that the terminals 203, 205 possess. The NOCC 207, as in step 303, assigns a predetermined minimum amount of bandwidth to each of the active users. This minimum value is configurable depending on the capacity of the system 200 and the number of terminals 203, 205.

Next, the NOCC 207 determines whether additional return channel bandwidth is available, per step 305. In the event that this minimal amount of bandwidth does not completely satisfy the requirements of one or more of the terminals 203, 205, the backlog information of all the terminals 203, 205 are examined to determine which terminals 203, 205 are in need of additional return channel bandwidth, per step 307.

If bandwidth is available, the NOCC 207 checks whether the system 200 can honor all of the bandwidth requirements (as indicated by the backlog information) using a default bandwidth level (step 309). The default bandwidth level is drawn from a set of predetermined bandwidth levels. In an exemplary embodiment, the set of bandwidth levels may be derived from traffic statistics that are gathered from the terminals 203, 205. If the default level cannot meet the additional bandwidth requirements of the particular terminals 203, 205, then a bandwidth level is selected from a set of predetermined bandwidth levels according to a predetermined criteria, as in step 311. The predetermined criteria can be specified dynamically by the NOCC 207. For example, the NOCC 207 may specify the criteria such that the bandwidth level that is nearest the next to the highest backlog is selected. In this manner, any attempts by a single terminal 203 to excessively consume the available bandwidth are curbed.

Steps 309 and 311 are repeated until a bandwidth level is reached in which some (or all) of the users' backlogs are satisfied across the entire span of users. At which time, the NOCC 207 allocates bandwidth to the terminals 203, 205, as in step 313, based upon the bandwidth level that was set. This approach advantageously ensures that all users receive a minimum amount of bandwidth before high bandwidth users are further bandwidth allocations.

The above bandwidth allocation process can be further refined, as detailed below.

Figure 4:
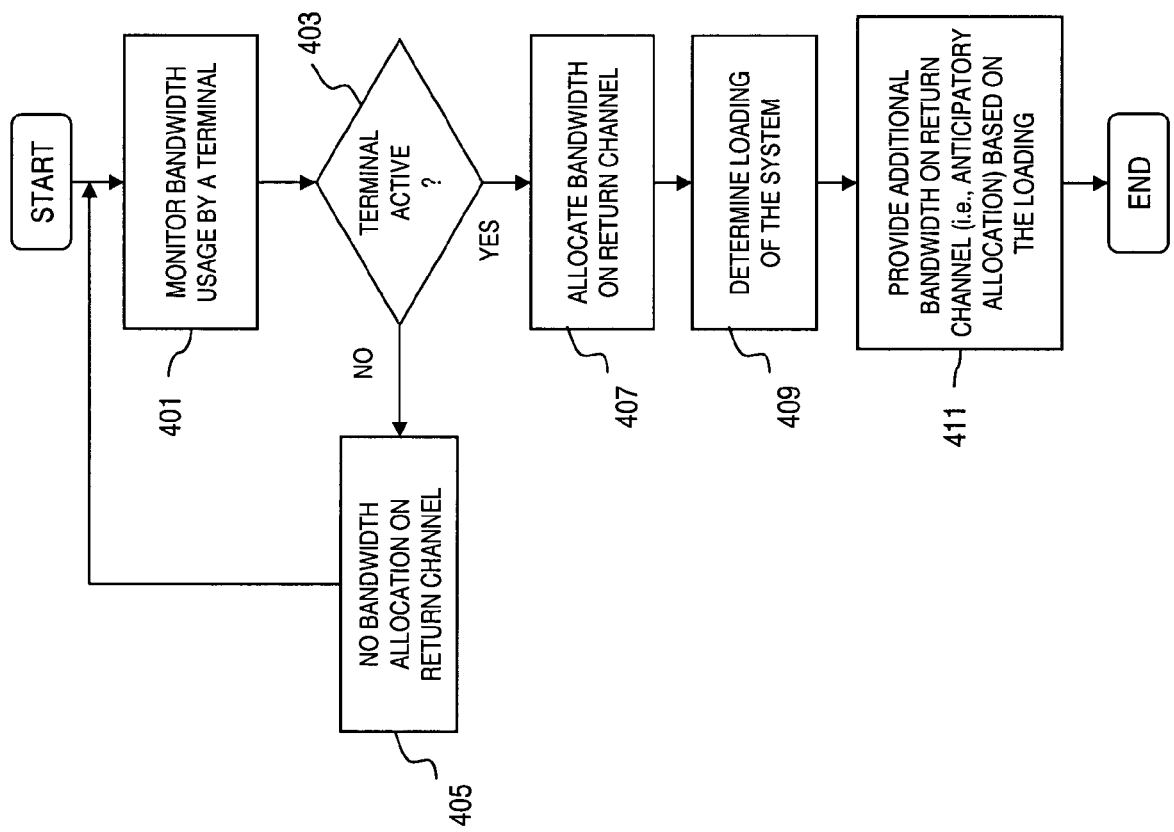
FIG. 4 is a flow chart of a process for providing anticipatory bandwidth allocation of the return channel utilized in the system of FIG. 1.

FIG. 4 is a flow chart of a process for providing anticipatory bandwidth allocation of the return channel utilized in the system of FIG. 1. As discussed previously with respect to FIG. 2, the NOCC 207 transmits the burst time plan with every TDMA frame, in which the burst time plan is limited in size for a specific inroute group (e.g., grouping of terminals based geography, service levels, etc.). Consequently, as the number of terminals 203, 205 on the system 200 increases, the burst sizing (or total number of burst allocated per frame time)—i.e., anticipatory bandwidth allocations—increases, potentially leading to unused system capacity.

To counteract this sizing phenomenon, a minimum burst size is configured sufficiently large to ensure that the total allocations never exceed what can be supported by the system 200. However, this minimum burst size can actually be larger than what is most efficient, particularly in the scenario in which inroute payload compression is utilized by the system 200. For example, 90% of follow-on traffic during a user session constitutes acknowledgement messages (in the case of Transmission Control Protocol/Internet Protocol (TCP/IP)), which can yield high compression gains. Therefore, a smaller and higher rate of bursts can provide a shorter response time, while providing greater bandwidth efficiency.

In step 401, the NOCC 207 monitors the bandwidth usage by the terminal 203, for example. Based upon this usage, the NOCC 207 determines whether the terminal 203 is active, per step 403. If the terminal 203 is not active, no bandwidth allocations on the return channel (i.e., inroute) is made (step 405). However, if the terminal 203 is active, the NOCC 207 allocates, as in step 407, bandwidth on the return channel to the terminal 203. The NOCC 207, per step 409, determines the loading of the system 200 by examining the allocations to all inroutes in the system 200. Next, in step 411, the NOCC 207 provides additional bandwidth on the return channels based on the loading of the system 200; this additional bandwidth allocation can be considered as an "anticipatory allocation" in that the NOCC 207 anticipates the terminal 203 to have subsequent traffic for transmission over the associated return channel.

Figure 5:
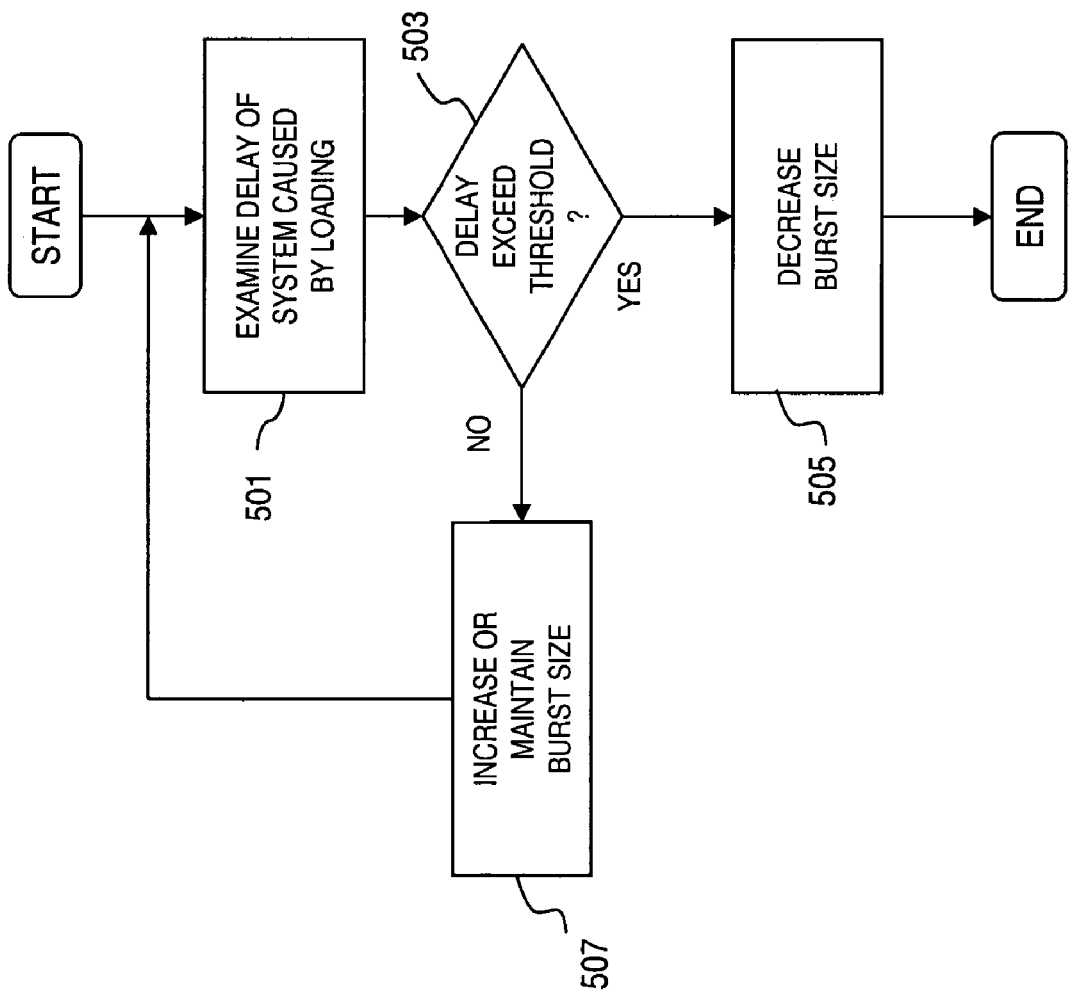
FIG. 5 is a flow chart of a process for providing anticipatory bandwidth allocation of the return channel by adjusting burst size, according to an embodiment of the present invention.

FIG. 5 is a flow chart of a process for providing anticipatory bandwidth allocation of the return channel by adjusting burst size, according to an embodiment of the present invention. In step 501, the delay of the system 200 caused by the loading is examined. The NOCC 207 determines whether this delay exceeds a predetermined threshold, per step 503. For example, if the NOCC 207 can provide a decreased burst size (per step 505) that minimizes wasted bandwidth while also keeping the packet delay short, then the shorter burst could be used. Otherwise, the burst size can be either maintained or increased, per step 507.

Therefore, during busy hours, a decision could be made, based on bandwidth allocation delay, that the delays are sufficiently large that using the smaller burst will not further impact response time. Also, such allocations, according to one embodiment of the present invention, can be used for only those users which have not transmitted for a given period of time—which can some fraction of a "holdover" time (i.e., duration in which the additional bandwidth allocations are provided).

The adjustment of burst sizing in the anticipatory allocations can be executed on a per-inroute level basis and/or per-group level basis.

Figure 6:
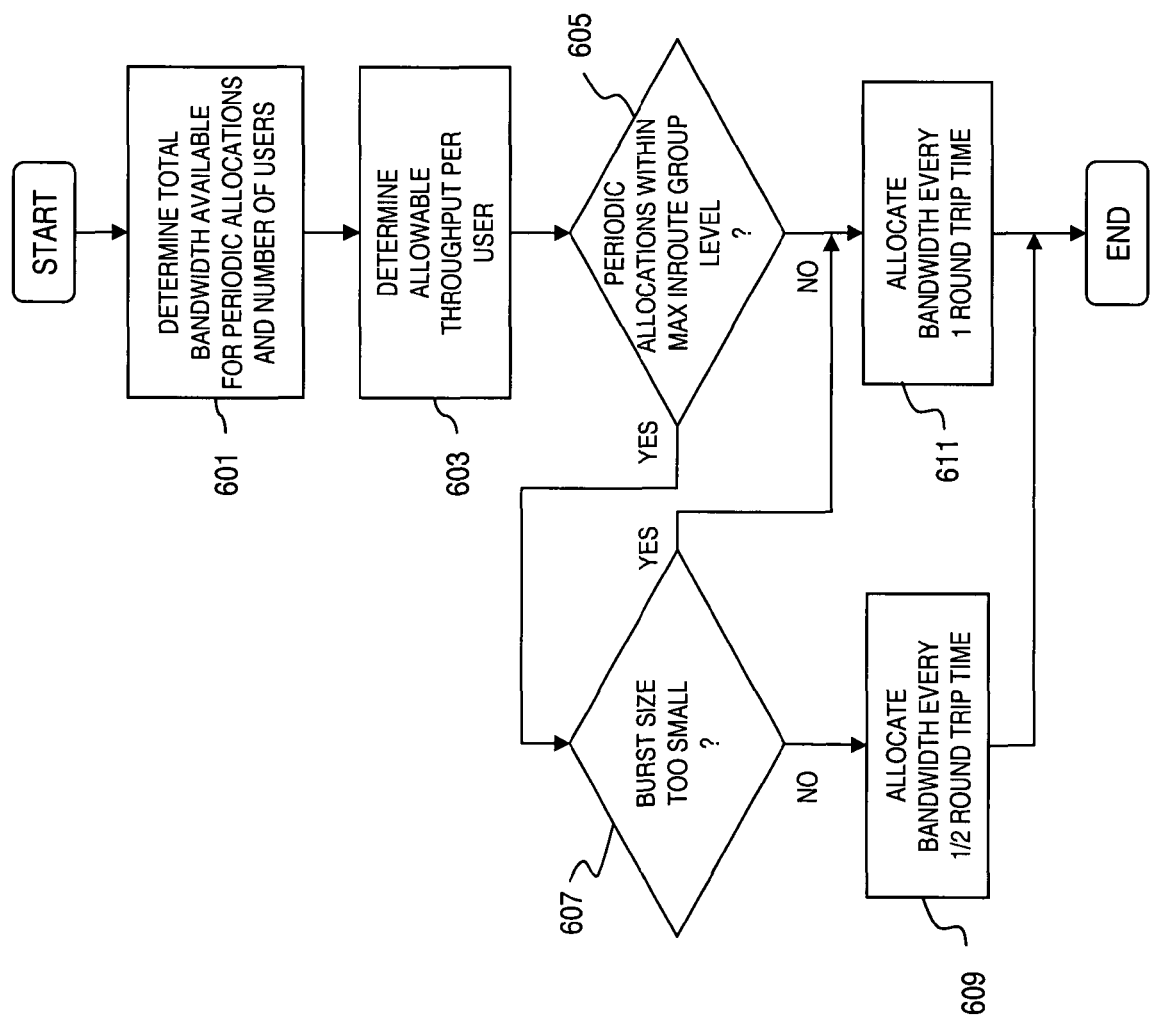
FIG. 6 is a flow chart of a process for providing anticipatory bandwidth allocation of the return channel by adjusting burst size on a per-inroute level basis, according to an embodiment of the present invention.

FIG. 6 is a flow chart of a process for providing anticipatory bandwidth allocation of the return channel by adjusting burst size on a per-inroute level basis, according to an embodiment of the present invention. In step 601, the total bandwidth available for periodic allocations is calculated, and the number of users on the inroutes is determined. Next, the throughput that can be provided per user is determined, per step 603.

The process, as in step 605, then checks whether the periodic allocations fall within the maximum allowable inroute group level. If the number of allocations allow (i.e., less than the maximum allowable inroute group level), then the process determines whether the size of the burst is too small, per step 607. The bandwidth is allocated to the user once every half-round-trip time, as in step 609, if the burst size is not too small.

However, if the burst is too small, then the bandwidth allocation is provided once per round trip tip, per step 611. Also, if the number of periodic allocations (i.e., anticipatory allocations) at the group level is exceeded (as determined in step 605), the allocation is provided once per round-trip time.

Figure 7:
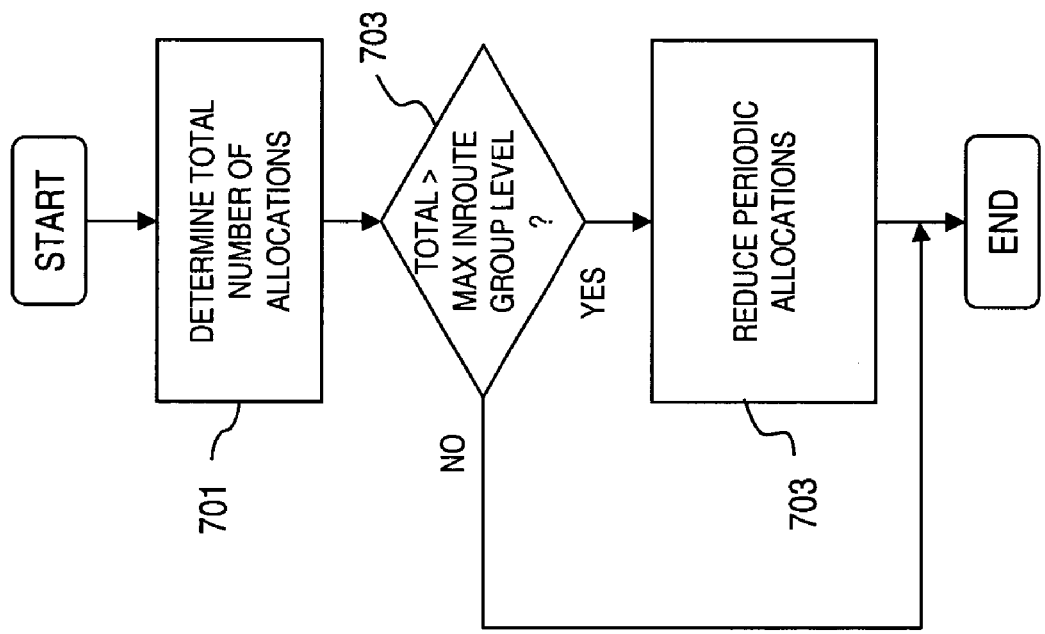
FIG. 7 is a flow chart of a process for providing anticipatory bandwidth allocation of the return channel by adjusting burst size on a per-group level basis, according to an embodiment of the present invention.

FIG. 7 is a flow chart of a process for providing anticipatory bandwidth allocation of the return channel by adjusting burst size on a per-group level basis, according to an embodiment of the present invention. This per-group level process ensures that the total number of anticipatory bandwidth allocations (i.e., periodic allocations) does not exceed the inroute group level limitation, which is a configurable threshold. In step 701, the total of number of periodic allocations is determined. In step 703, this the total is compared to the threshold, which represents the maximum inroute group level; i.e., the maximum for the periodic allocations allowed per inroute per frame based on the total number of allocations allowed for the group. If the threshold is exceeded, the periodic allocations for the group are reduced, as in step 705.

Figure 8:
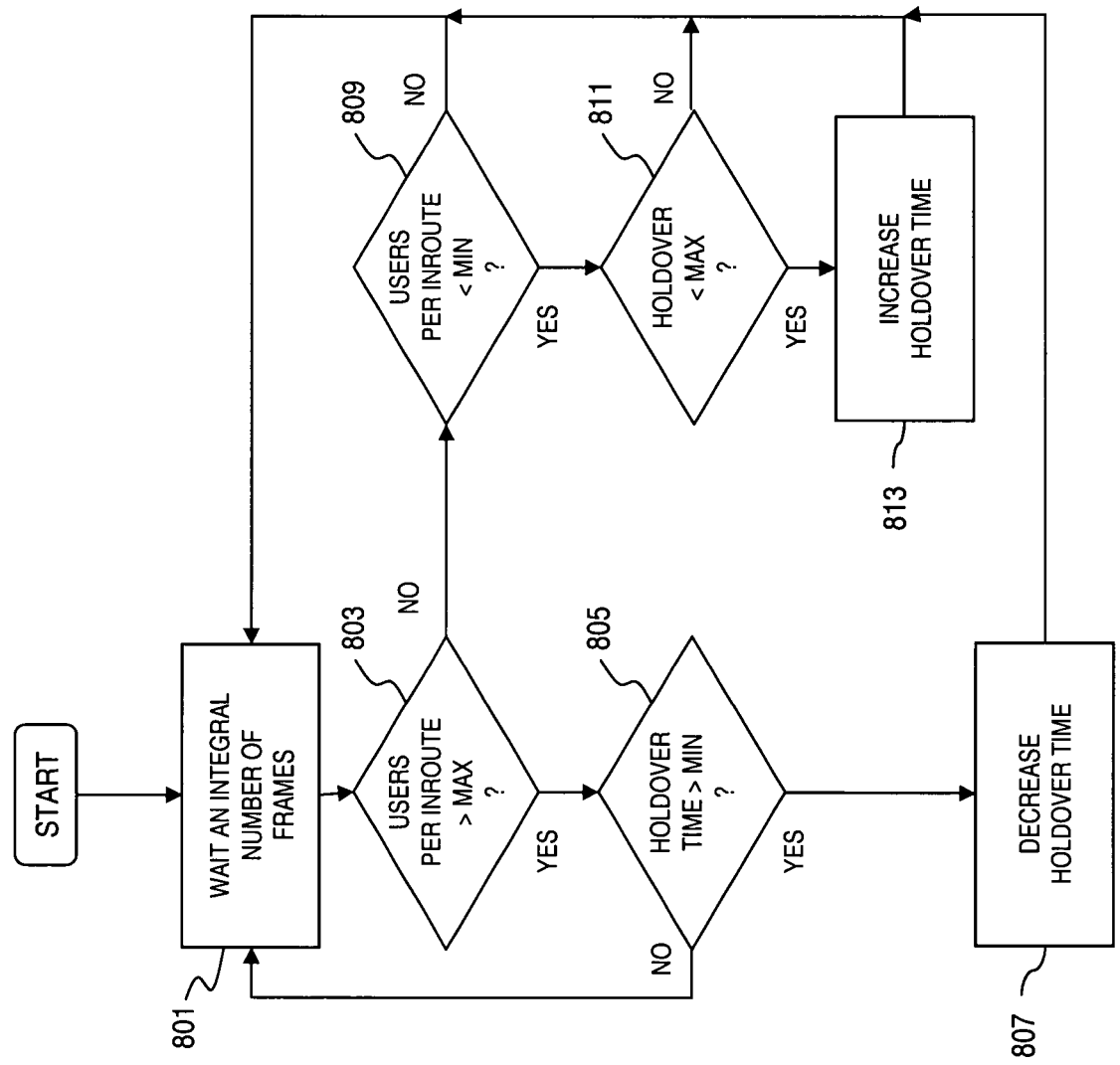
FIG. 8 is a flow chart of a process for providing anticipatory bandwidth allocation of the return channel by adjusting a holdover time, according to an embodiment of the present invention.

FIG. 8 is a flow chart of a process for providing anticipatory bandwidth allocation of the return channel by adjusting a holdover time, according to an embodiment of the present invention. When a terminal 203, 205 within the system 200 has not transmitted for a period of time, the terminal is considered inactive. As a result, no bandwidth for the return channel traffic is allocated. Once the terminal 203, 205 transmits a request for bandwidth and becomes active, the terminal 203, 205 will continue to receive bandwidth to attempt to meet the backlog—i.e., queued traffic.

According to one embodiment of the present invention, upon satisfaction of the backlog, the terminal 203, 205 will continue to receive periodic bandwidth for a predetermined period of time, denoted as the "holdover" time (in frames), in anticipation that the terminal 203, 205 will have additional traffic to transmit. This anticipatory allocation (or periodic allocation) helps reduce user response time, avoiding the round trip time associated with the request for bandwidth allocation.

The present approach provides an automated mechanism to dynamically adjust the holdover time based on loading of the system 200—i.e., expected delay of getting data through the system 200. By way of example, during peak busy hours, the holdover time can be lowered to permit more efficient use of bandwidth, such that bandwidth is allocated to the terminals 203, 205 actually in need of the capacity.

During non-busy times, a maximum inter-frame delay is used to ensure that the periodic bandwidth is assisting with the response time improvement of the system 200. During busier hours, the system 200 would be biased toward ensuring that bandwidth is being used for real user traffic at the expense of response time since the response time has already be degraded by the throughput per user.

The process of FIG. 8 can be employed on a periodic basis to adjust the "holdover" time. Initially, the process waits for a predetermined period corresponding to an integral number of frames, per step 801. That is, the period should be an integral number of TDMA frames and of sufficient duration (e.g., at least a minute) to ensure that cyclical burstiness issues in the satellite system 200 are addressed. The parameters used by this approach include the following: Minimum Holdover value, a Maximum Holdover value, Minimum Users per Inroute, and Maximum Users per Inroute. As seen in FIG. 3, the process determines whether the number of users (i.e., terminals) per inroute exceeds the Maximum value, as in step 803. If the Maximum value is exceeded, then the process determines whether the holdover time is greater than the Minimum Holdover time (step 805); if so, the Holdover time is decreased, per step 807.

In the decision of step 803, if the number of users per inroute does not exceed the Maximum value, then the process checks, as in step 809, whether the number of users per inroute is less than the Minimum value. If so, the Holdover time is compared to the Maximum Holdover time, per step 811. Based on the comparison, the Holdover time is increased, per step 813, if the Holdover time is less than the Maximum value.

As seen from the above process, if the number of users per inroute is within the Minimum and Maximum range, the Holdover time is not adjusted. However, if the value exceeds the maximum, the Holdover time is decreased. If the value falls below the minimum, the Holdover is increased. This automatic adjustment of Holdover time advantageously improves bandwidth efficiency.

With this improvement, it is noted that the throughput per user increases which compensates for any potential additional delay that may result from data not fitting into a burst.

Figure 9:
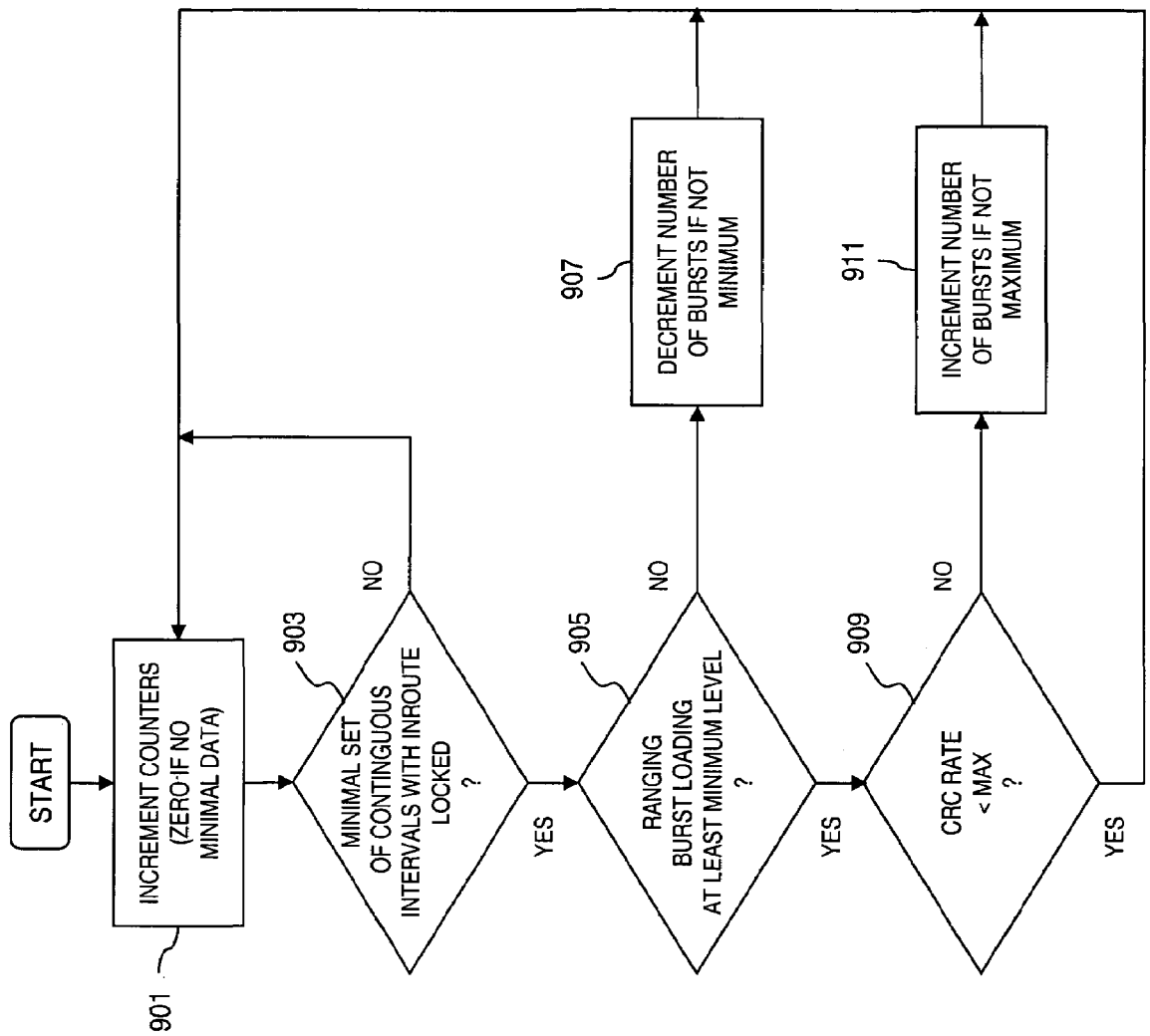
FIG. 9 is a flow chart of a process for managing return channel bandwidth allocation in support of ranging, according to an embodiment of the present invention.

FIG. 9 is a flow chart of a process for managing return channel bandwidth allocation in support of ranging, according to an embodiment of the present invention. As part of the initial startup of the terminals 203, 205, these terminals are required to manipulate their TDMA timing to adjust for their locations with respect to the satellite 201. These terminals 203, 205 must also adjust their transmit power to account for the transmission requirements according to their locations in the footprint of the satellite 201. After the initial installation and startup, these adjustments to timing and power are performed through the use of ranging bursts, which are bandwidth allocations designated for this ranging event.

For proper operation of the terminals 203, 205, the two-way satellite system 200 checks periodically (or on demand) for timing and power accuracy. During the initial installation of these terminals 203, 205, the adjustments performed for timing and power accuracy are not a grave concern. Thereafter, the verification of the timing and power accuracy is automatically initiated when the terminal 203, 205 detects that it is necessary. However, the process of verification and readjustment, if performed on a large scale, may cause system overload, for example, when a large number of terminals 203, 205 required to readjust based on some system-level change that affects all of the terminals 203, 205.

This capability ensures that such bursts of activity can be handled automatically by the system without resizing the system bandwidth allocations. The approach also ensures that the system is efficiently returning the bandwidth for other uses when the allocation is not required.

The system 200, according to an embodiment of the present invention, provides a centralized approach to adjust system capacity for rapidly verifying all of the terminals 203, 205. That is, the system 200 concurrently readjusts or verifies a large number of terminals for timing and power, allowing readjustment and verification when system-level return channel changes are made such as the power requirements on the satellite or to fix units that are moved and causing system-level transmission interference.

Accordingly, the system 200 can support re-ranging of a vast number of terminals (e.g., hundreds of thousands) within a short period, such as overnight, if a system-level timing problem arises. In addition, such capability permits all terminals 203, 205 to be rechecked for power and timing periodically to ensure that users moving their antenna dishes to other locations do not cause interference with other users on the system 200.

Essentially, the ranging capacity is adjusted to allow many more terminals to quickly range after a system-wide problem forces the ranging process. The backoffs are not modified, but additional unallocated and allocated ranging bursts are added to support the requests.

The process of FIG. 9 can be executed on a periodic basis to adjust the sizing in regards to the number of unallocated and allocated ranging bursts. The period should be an integral number of TDMA frames and should be greater than the ALOHA retransmission time configured for the system 200.

The process maintains counters that reflect the current number of ranging bursts during a particular ranging period. In step 901, these counters are incremented according to the quantity of ranging bursts; if there is no minimal data, then the counters are set to zero. The process determines, per step 903, whether the minimal set of contiguous intervals within the inroute is locked. If so, it is determined whether the burst loading is at least at the minimum level, per step 905. In an exemplary embodiment, the minimum burst loading (e.g., in $10^{th}$ of percent) during the period and is the total good bursts divided by the current number of bursts. If not, then the number of bursts is decremented (step 907). However, if the burst loading is at least the minimum level, then the CRC rate is checked, as in step 909, whether it is less than the maximum value.

Similar to the minimum burst loading definition, the maximum CRC rate (in $10^{th}$ of percent) in the period is the total CRC bursts divided by the current number of bursts. The current number of bursts is incremented, per step 911, if the CRC rate is less than the maximum and the current number of bursts is not the maximum value.

Figure 10:
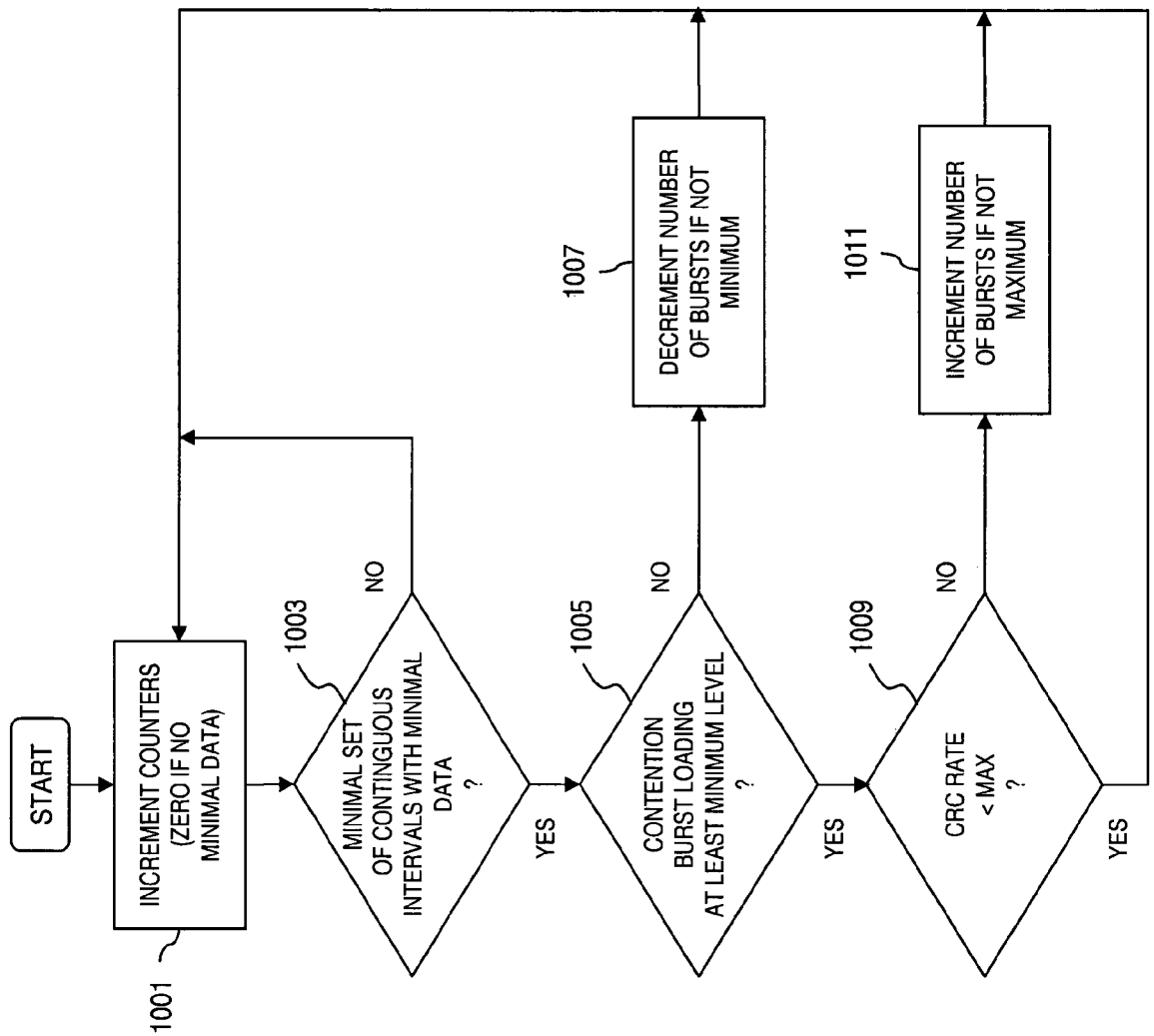
FIG. 10 is a flow chart of a process for adjusting usage of contention and non-contention channels based on system loading, according to an embodiment of the present invention.

FIG. 10 is a flow chart of a process for adjusting usage of contention and non-contention channels based on system loading, according to an embodiment of the present invention. In the system 200, when a terminal 203, 205 has not transmitted for a period of time, the terminal becomes inactive, and is therefore not provided with bandwidth for the return channel traffic. The system 200, according to one embodiment of the present invention, contention channels are used to allocate non-contention bandwidth. That is, to receive bandwidth, the terminal 203, 205 needs to initially use a contention channel, e.g., an ALOHA burst, to transmit traffic to the NOCC 207 to request allocations to the return channel.

One approach to sizing the contention channel bandwidth (i.e., ALOHA bandwidth) is for the NOCC 207 to statically allocate the capacity that the system 200 is expected to handle. However, this approach to sizing can result in underallocation in some instances, and overallocation in other situations. For example, the NOCC 207 would underallocate (and therefore causes user traffic delays) when there are short term burst requirements, such as when the system 200 becomes active after an outage or due to user activation patterns. Also, the NOCC 207 overallocates bandwidth during periods when the requirements for ALOHA bandwidth is much lower. As a result, bandwidth efficiency suffers.

By contrast, the process of FIG. 10 advantageously adjusts the balance between contention and non-contention channels based on loading of the system 200 to promote bandwidth efficiency. The process of FIG. 10 provides an automated adjustment to account for load of the contention channels to ensure that they are available, as needed, and that they are not wasted when not required.

Under this approach, the system 200 can adjust to high levels of terminals 203, 205 going active, such as when the system 200 is first brought up or during the time when a large number of terminals 203, 205 are activated—as noted, these terminals can be in the order of several hundreds of thousands. It is recognized that the system 200 can reuse bandwidth for non-contention use during normal to low periods when the amount of contention-oriented traffic is less, thereby providing efficiency in bandwidth utilization without manual intervention.

The process of FIG. 10 provides for a periodic adjustment the ALOHA sizing—i.e., sizing of the contention channel allocation. In an exemplary embodiment, the period is set to be an integral number of TDMA frames and should be greater than the ALOHA retransmission time configured for the system 200.

In step 1001, burst counters are incremented according to the quantity of the ALOHA bursts in a given period; if there is no minimal data, then the counters are set to zero. Next, in step 1003, the process determines whether there is a minimal set of contiguous intervals. If so, it is determined whether the ALOHA burst loading is at least at the minimum level, per step 1005. Similar to the process of FIG. 9, the minimum burst loading (e.g., in $10^{th}$ of percent) during the period and is the total good bursts divided by the current number of bursts. If not, then the number of bursts is decremented (step 1007). If the burst loading is at least the minimum level, then the CRC rate is checked whether it is less than the maximum value, as in step 1009. Again, the maximum CRC rate (in $10^{th}$ of percent) in the period is the total CRC bursts divided by the current number of bursts. The current number of bursts is incremented, per step 1011, if the CRC rate is less than the maximum and the current number of bursts is not the maximum value.

FIGS. 11A-11C are diagrams of the structures of exemplary packets used in the system of FIG. 1. An Inroute Group Definition Packet (IGDP) packet 1101, as shown in FIG. 11A, is used by the system 200 to define the return channels on a return channel group, and to allow selection of return channel groups for ALOHA and Non-allocated ranging. Return channel groups are used to allow for load sharing between a number of return channels, and to minimize the outroute bandwidth required to control the return channel bandwidth allocation. The use of such groups also may limit the amount of information that needs to be cached or processed by a terminal (e.g., terminal 203 of FIG. 2).

The inroute group definition packet 1101 includes the following fields: a Frame Type field 1101a, an Inroute Group ID (identification) 1101b, a Return Channel Type field 1101c, an ALOHA Metric field 1101d, a Ranging Metric field 1101e, and a Frequency Table field 1101f. For the inroute group definition packet 1101, the Frame Type field 1101a specifies the type of the packet 1101. For example, to designate that the packet 1101 is an inroute group definition packet, a unique value, such as 2, is stored. The Inroute Group ID field 1101b identifies a particular inroute group. In an exemplary embodiment, the field 1101b is 7 bits in length. The Return Channel Type field 1101c uses 4 bits to indicate the type of return channels that are defined in the inroute group; e.g., the value of 0 is defined as 64 Kbps with convolutional encoding.

The ALOHA Metric field 1101 (a 16 bit field) is used for random weighted selection of a return channel group when going active, and is based on the number of ALOHA bursts that are defined and the collision rate on those bursts. The metric value also accounts for loading on the NOCC 207, or the Return channel Group. For example, a value of 0 indicates that ALOHA is not currently available on this Return channel Group. The Ranging Metric field 1101f, which is 16-bits, is used for random weighted selection of a Return channel Group when performing Nonallocated Ranging. The ranging metric value is based on the number of Nonallocated Ranging bursts that are defined and associated collision rate on those bursts. For example, a value of 0 indicates that Nonallocated Ranging is not currently available on this Return channel Group.

The packet 1101 has a variable length (N×24 bits) Frequency Table field 1101g, which is used to transmit on each of the return channels in the group. According to one embodiment, an upper bound of no more than, for example, 4000 return channels between all return channel groups for an outroute is specified. The upper bound for the number of return channels in each return channel group depends on the limit of the number of Burst Allocations in the bandwidth allocation packet (FIG. 11B). The value of N is derived from the length of the IP Datagram.

When a terminal 203 is active, the terminal 203 may monitor its current Inroute Group, as well as a second Inroute Group around the time the terminal 203 is moved among Inroute Groups. To limit latency when a terminal needs to go active, all inactive terminals with valid Ranging information may use the following procedures. Every predetermined (e.g., $4^{th}$) frame time, the terminal 203 may make a random weighted selection between all the Inroute Group's that advertise a non-zero ALOHA Metric, and may start to monitor that Inroute Group. The previous Inroute Group may need to be monitored until all previous bandwidth allocation packets have been received, or lost.

For every frame time, the terminal 203 may randomly select one of the ALOHA bursts from the bandwidth allocation packet for the Inroute Group that is selected for that frame time. When the terminal 203 goes active and has no outstanding ALOHA packets, the terminal 203 may select a random number of frames (e.g., from 1 to 8), ignoring any frame times that had no bandwidth available, it may transmit a single burst during the randomly selected frame time, and wait to be acknowledged. If the terminal 203 has not received an acknowledgement (e.g., the acknowledgement is lost), the terminal 203 may resend the ALOHA packet.

In order to limit latency when the terminal 203, 205 needs to go active, all inactive terminals with invalid ranging information may use a similar procedure for non-allocated ranging bursts. The approach may be augmented to include a default power level for the first nonallocated ranging burst. Further, this power level may be increased until the ranging acknowledgement message is received by the terminal 203.

A bandwidth allocation packet (BAP) 1103, shown in FIG. 11B, is used to define the current bandwidth allocation for all inroutes connected to an Inroute Group. The packet 1103 includes a Frame Type field 1103a (which has a value of 3 to indicate a BAP), and a 16-bit Frame Number field 1103b, which indicates the Frame Number that is allocated in this packet 1103, and may be larger than the current Frame Number. The difference between the frame numbers is a fixed offset to allow the terminal 203 sufficient time to respond to changes in bandwidth allocation. A Burst Allocation field 1103c has a length of N×24 bits and specifies all the burst allocations for each inroute. The field 1103c may order all the bursts in a frame, and may repeat a frame for each inroute in the Group.

FIG. 11C shows an exemplary burst allocation field of the packet 1103 in FIG. 11B. The Burst Allocation field 1103c includes an Assign ID field 1105a, a Ranging field 1105b, and a Burst Size field 1105c. The Assign ID field 1105a provides a unique identifier that is used to indicate the particular terminal 203, 205 that has been allocated the bandwidth. For example, a value of 0 for the field 1105a indicates ALOHA (and Nonallocated Ranging) bursts, while a non-zero value may be used to indicate unassigned bandwidth.

The Ranging field 1105b specifies whether the burst is allocated for normal or ranging bursts. Even though, for example, the terminal 203 may be designated as ranging, that terminal 203 may be able to send Encapsulated Datagrams over the inroute; and an active user may have Ranging turned on/off to test or fine tune its values, with minimal impact on performance. The Burst Size field 1105c can be specified in terms of slots and includes the aperture and burst overhead.

For each TDMA frame, the terminal 203 may receive another bandwidth allocation packet 1103 from the Inroute Group it is currently expecting to receive bandwidth allocation on. The terminal 203 may need to scan the entire table to obtain the necessary information to transmit data, and process acknowledgements.

Once an AssignID is assigned to the terminal 203 on an Inroute Group, the assignment may not change while the terminal remains active—except as part of a move between Inroute Groups. It is important to note that if an Inroute Group advertises that it has ALOHA or Nonallocated Ranging bursts, than it may have some number of those bursts defined every frame time—e.g., for the next ten frame times.

FIG. 11D shows an exemplary burst data frame (i.e., inroute packet) for ALOHA (and ranging) bursts. The NOCC 207 can detect the type of burst from the frame numbering information in the packet header. The structure for the inroute packet include the following fields: a Serial Number Low field 1107a, a Backlog Indicator field 1107b, Padding Indicator field 1107c, Frame Number field 1107d, Burst Number field 1107e, a Length Forward Error Correction (FEC) field 1107f, a Length field 1107g, a Serial Number High field 1107h, a Destination ID field 1107i, a Backlog field 1107j, a Padding field 1107k, an Encapsulated Datagrams field 1107l, and a Cyclic Redundancy Check (CRC) field 1107m. The Serial Number Low field 1107a stores the 8 least significant bits of the serial number. The 1-bit Backlog Indicator field 1107b indicates the presence of the Backlog field; for instance, this is present for ALOHA and Nonallocated Ranging bursts. The 1-bit Padding Indicator field 1107c indicates the absence of the Padding field. If they are not set, then the packet is already padded, and one byte of padding can be traded for enabling the Backlog.

The Frame Number field 1107d stores the 2 least significant bits of the frame number, and may help the NOCC 207 to determine which burst was received. The 4-bit Burst Number field 1107e indicates the burst slot that the frame was transmitted in, assisting with identifying that burst as an ALOHA type burst. The 8-bit Length FEC field 1107f is the FEC value for the length, produced via table lookup in software. The 8-bit Length field 1107g is the length of the burst and includes all the bytes starting with the Backlog Indicator field 1107b through the CRC field 1107m. The 8-bit Serial Number High field 1107h stores the 8 most significant bits of the of the Source terminal's serial number. The Destination ID field 1107I specifies the destination hybrid gateway.

The Backlog field 1107j indicates the number of bytes of Backlog that are present. The Padding field 1107k, if present, has its first byte indicating the total number of Padding bytes (N); all the other bytes are "Don't Care". This field 1107k is used to allow for stuffing packets to maintain link utilization when no data needs to be transferred. The CRC field 1107m stores a 16-bit CRC; a burst with an invalid CRC is dropped and statistics retained.

These above exemplary packets are further detailed in co-pending application to Kelly, entitled "System and Method for Scaling A Two-way Satellite System" (Ser. No. 09/789,079) filed Feb. 20, 2001; the entirety is incorporated herein by reference.

Figure 12:
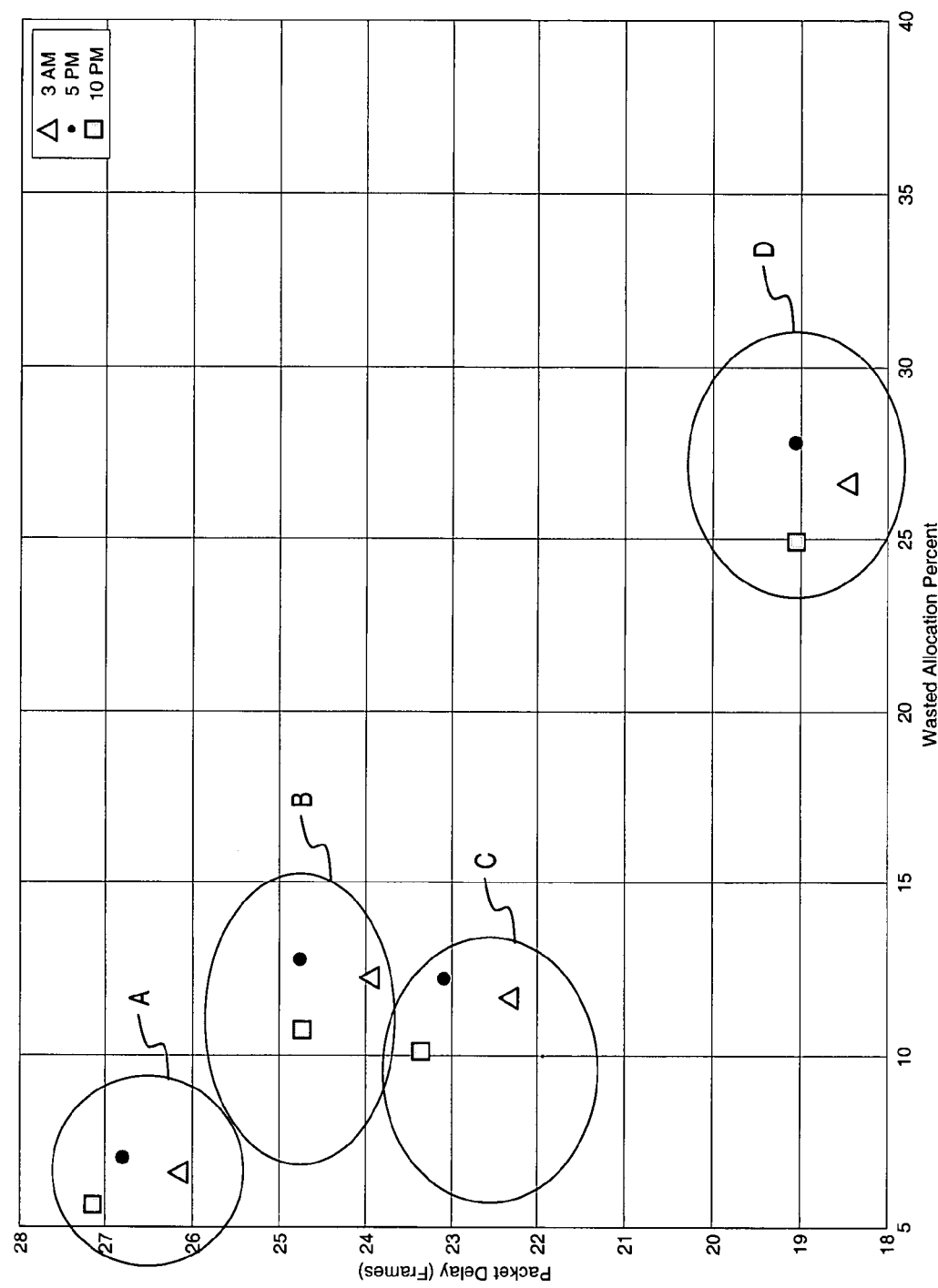
FIG. 12 is a graph showing return channel bandwidth performance achieved by the system of FIG. 2.

FIG. 12 is a graph showing return channel bandwidth performance achieved by the system of FIG. 2. The graph reflects a number of stimulations, and reveals that a smaller burst can provide a positive improvement with respect to the amount of wasted bandwidth. Table 2, below, summarizes these scenarios.

TABLE

| Stimulation | 3 AM (Slots, Period, Overhang/ ALOHA) | 5 PM (Slots, Period, Overhang/ ALOHA) | 10 PM (Slots, Period, Overhang/ ALOHA) |
| --- | --- | --- | --- |
| A | 4, 16, 2/ 20289 | 4, 16, 2/ 23579 | 4, 16, 2/ 20504 |
| B | 10, 16, 2/ 21892 | 10, 16, 2/ 25275 | 10, 16, 2/ 22243 |
| C | 4, 8, 2/ 15358 | 4, 8, 2/ 21892 | 4, 8, 2/ 14025 |
| D | 10, 8, 2/ 15798 | 10, 8, 2/ 17880 | 10, 8, 2/ 14706 |

Figure 13:
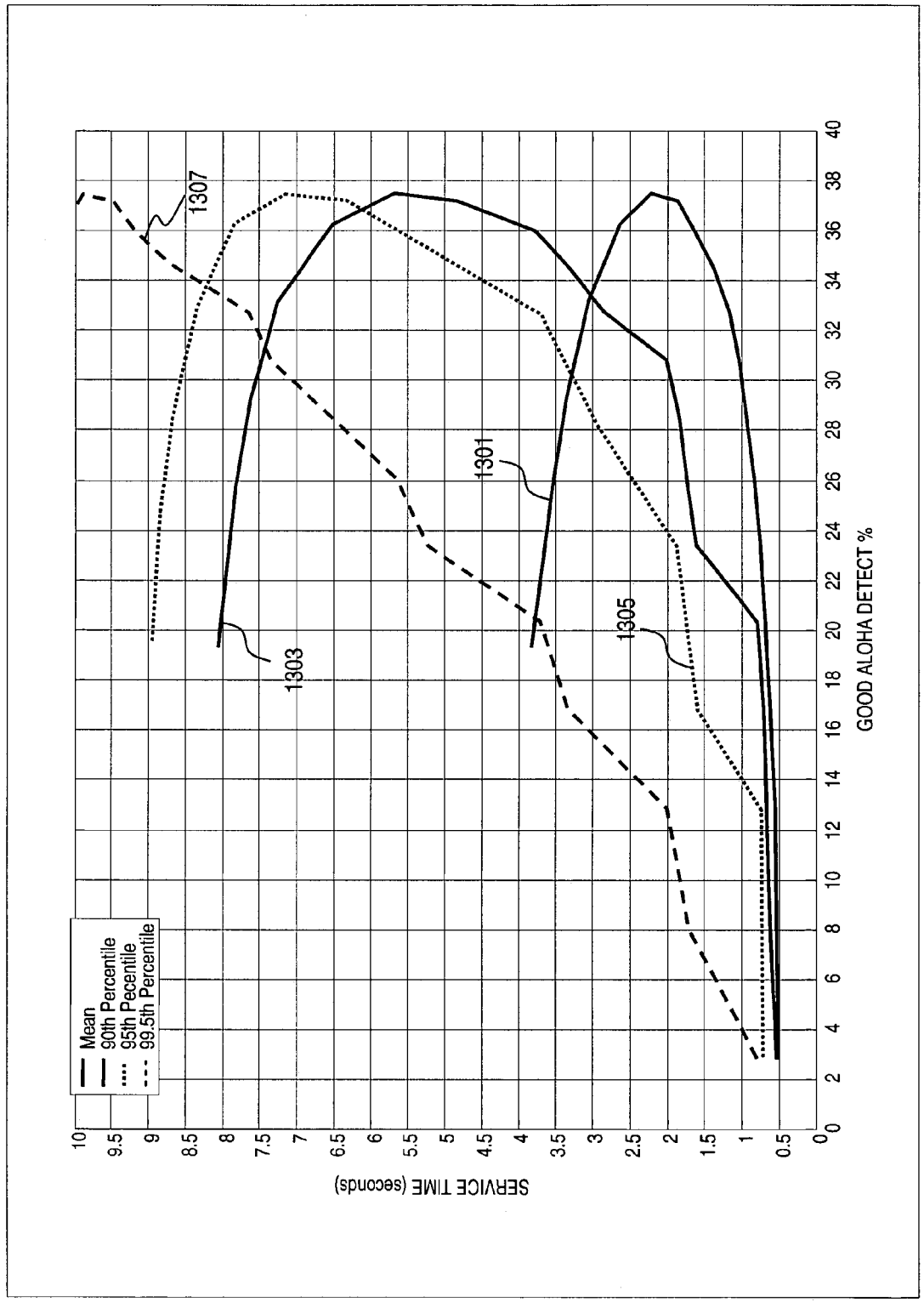
FIG. 13 is a graph showing utilization versus retransmission rates according to the process of FIG. 10.

FIG. 13 is a graph showing utilization versus retransmission rates according to the process of FIG. 10. Specifically, the graph shows the utilization and retransmission rates for the ALOHA bursts as the system load on ALOHA bandwidth changes. From this chart, the overallocation and underallocation cases can be detected and the ALOHA pool adjusted to achieve a system load that is within a reasonable range. Curve 1301 represents the mean. The $90^{th}$ percentile, $95^{th}$ percentile, and $99.5^{th}$ percentile are represented by curves 1303, 1305, and 1307, respectively.

Figure 14:
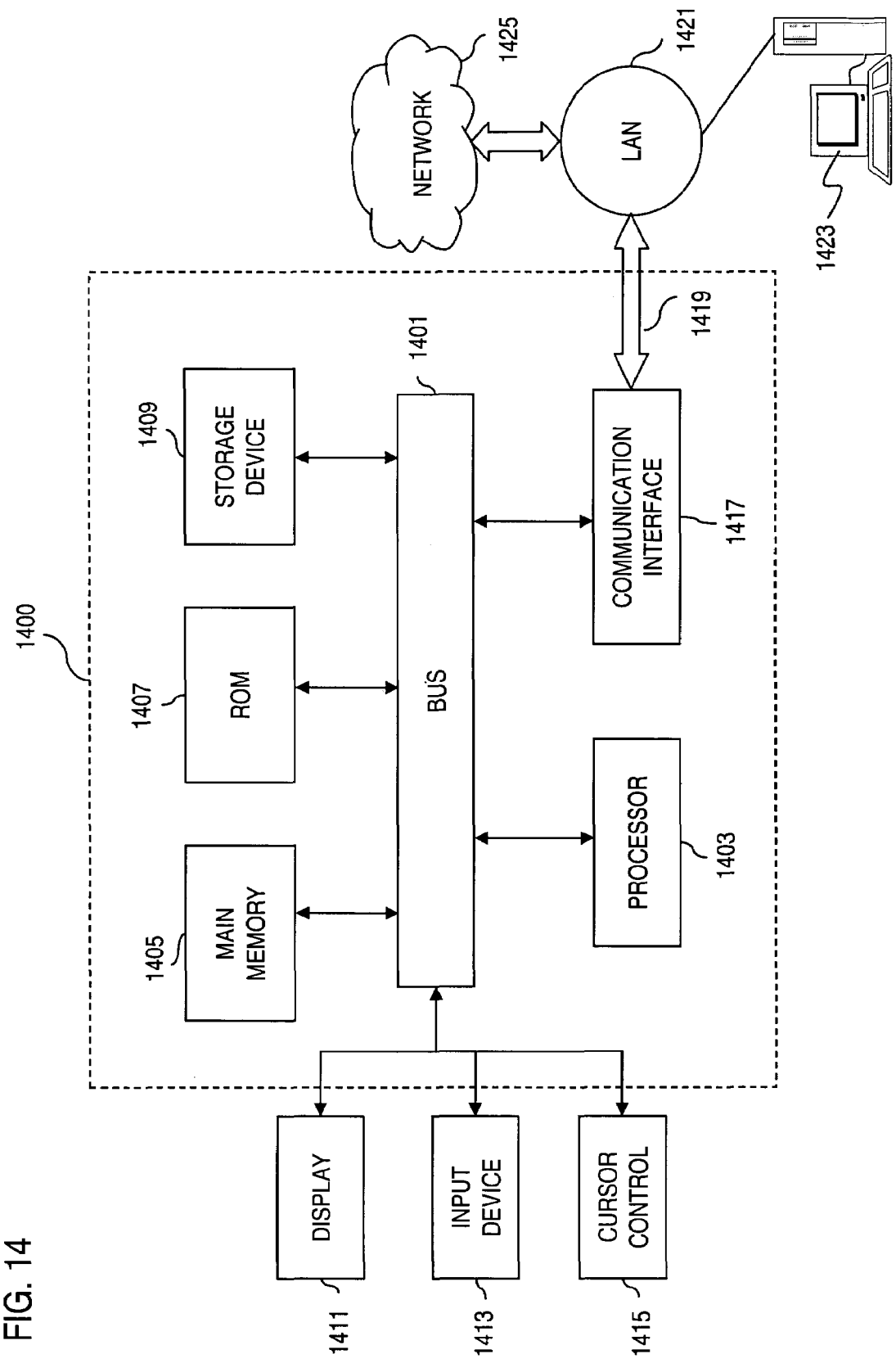
FIG. 14 is a diagram of a computer system that is capable of managing return channel bandwidth, according to an embodiment of the present invention.

FIG. 14 is a diagram of a computer system that is capable of managing return channel bandwidth, according to an embodiment of the present invention. The computer system 1400 includes a bus 1401 or other communication mechanism for communicating information and a processor 1403 coupled to the bus 1401 for processing information. The computer system 1400 also includes main memory 1405, such as a random access memory (RAM) or other dynamic storage device, coupled to the bus 1401 for storing information and instructions to be executed by the processor 1403. Main memory 1405 can also be used for storing temporary variables or other intermediate information during execution of instructions by the processor 1403. The computer system 1400 may further include a read only memory (ROM) 1407 or other static storage device coupled to the bus 1401 for storing static information and instructions for the processor 1403. A storage device 1409, such as a magnetic disk or optical disk, is coupled to the bus 1401 for persistently storing information and instructions.

The computer system 1400 may be coupled via the bus 1401 to a display 1411, such as a cathode ray tube (CRT), liquid crystal display, active matrix display, or plasma display, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for controlling cursor movement on the display 1411.

According to one embodiment of the invention, the cache list generator 601 is implemented by the computer system 1400 in response to the processor 1403 executing an arrangement of instructions contained in main memory 1405. Such instructions can be read into main memory 1405 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement the embodiment of the present invention. Thus, embodiments of the present invention are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. For example, the communication interface 1417 may be a digital subscriber line (DSL) card or modem, an integrated services digital network (ISDN) card, a cable modem, a telephone modem, or any other communication interface to provide a data communication connection to a corresponding type of communication line. As another example, communication interface 1417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a PCMCIA (Personal Computer Memory Card International Association) interface, etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 (e.g. a wide area network (WAN) or the global packet data communication network now commonly referred to as the "Internet") or to data equipment operated by a service provider. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network(s), the network link 1419, and the communication interface 1417. In the Internet example, a server (not shown) might transmit requested code belonging to an application program for implementing an embodiment of the present invention through the network 1425, the local network 1421 and the communication interface 1417. The processor 1403 may execute the transmitted code while being received and/or store the code in the storage device 1409, or other non-volatile storage for later execution. In this manner, the computer system 1400 may obtain application code in the form of a carrier wave.

The term "computer-readable medium" as used herein refers to any medium that participates in providing instructions to the processor 1403 for execution. Such a medium may take many forms, including but not limited to non-volatile media, volatile media, and transmission media. Non-volatile media include, for example, optical or magnetic disks, such as the storage device 1409. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, an approach is provided for adjusting bandwidth allocations on a contention channel in a bandwidth constrained system (such as a satellite network). The contention channel can be utilized for transporting data traffic or support network administrative functions (e.g., ranging), by taking into account the dynamic nature of the system load. According to one embodiment of the present invention, a network receives anticipatory bandwidth for a predetermined duration after its backlog is reduced in anticipation of new traffic. This holdover time can be dynamically adjusted to account for the system loading. In addition, the size of the anticipatory bandwidth allocation can be altered based on the loading. The above approach advantageously supports more efficient utilization of bandwidth under various loading conditions by allocating bandwidth in a manner that increases overall system throughput, while minimizing network delay.

While the present invention has been described in connection with a number of embodiments and implementations, the present invention is not so limited but covers various obvious modifications and equivalent arrangements, which fall within the purview of the appended claims.

What is claimed is:

1. A method for managing bandwidth in a data network, the method comprising:
   allocating capacity on a communication channel for a terminal to transmit data over the communication channel;
   in anticipation of the terminal having to transmit additional data, further allocating additional capacity on the communication channel for the terminal,
   wherein the anticipatory allocation is determined according to loading of the data network, wherein the communication channel in the allocating step is established by a transmission frame; and
   selectively adjusting, based on the loading, burst size per frame corresponding to the anticipatory allocation.

2. A method according to claim 1, wherein the step of further allocating is performed for a predetermined period after the initial allocation, the method further comprising: selectively adjusting the predetermined period based on the loading.

3. A method according to claim 1, wherein the terminal is one of a plurality of terminals in the data network, and the allocation of capacity including the additional capacity of the communication channel is provided to the plurality of terminals, the method further comprising:
   determining available capacity of the communication channel for the anticipatory allocations; and
   limiting the anticipatory allocations to a predetermined level based on the available capacity of the communication channel.

4. A method according to claim 1, wherein the terminal is one of a plurality of terminals in the data network and the data network supports a plurality of communication channels, the method further comprising:
   determining available capacity across a group of the plurality of communication channels for the anticipatory allocations; and
   limiting the anticipatory allocations to a predetermined level based on the available capacity across the group of communication channels.

5. A method according to claim 1, wherein the data network includes a satellite for supporting two-way communication between the terminal and a hub, and the terminal is a Very Small Aperture Terminal (VSAT), the communication channel being based on Time Division Multiple Access (TDMA).

6. A computer-readable medium bearing instructions for managing bandwidth in a data network, the instructions being arranged, upon execution, to cause one or more processors to perform the following:
   allocating capacity on a communication channel for a terminal to transmit data over the communication channel;
   in anticipation of the terminal having to transmit additional data, further allocating additional capacity on the communication channel for the terminal,
   wherein the anticipatory allocation is determined according to loading of the data network, wherein the communication channel in the allocating step is established by a transmission frame; and
   selectively adjusting, based on the loading, burst size per frame corresponding to the anticipatory allocation.

7. A system for managing bandwidth in a data network, the system comprising: a relay station configured to support transmission of data over a communication channel; and
   a hub configured to allocate capacity on the communication channel for a terminal to transmit the data over the communication channel,
   wherein, in anticipation of the terminal having to transmit additional data, the hub further allocates additional capacity on the communication channel for the terminal, the anticipatory allocation being determined according to loading of the data network,
   wherein the communication channel is established by a transmission frame, the hub being further configured to selectively adjust, based on the loading, burst size per frame corresponding to the anticipatory allocation.

8. A system according to claim 7, wherein the anticipatory allocation is performed for a predetermined period after the initial allocation, the hub being further configured to selectively adjust the predetermined period based on the loading.

9. A system according to claim 7, wherein the terminal is one of a plurality of terminals in the data network, and the allocation of capacity including the additional capacity of the communication channel is provided to the plurality of terminals, the hub being further configured to determine available capacity of the communication channel for the anticipatory allocations, and to limit the anticipatory allocations to a predetermined level based on the available capacity of the communication channel.

10. A system according to claim 7, wherein the terminal is one of a plurality of terminals in the data network, and the relay station supports a plurality of communication channels, the hub being further configured to determine available capacity across a group of the plurality of communication channels for the anticipatory allocations, and to limit the anticipatory allocations to a predetermined level based on the available capacity across the group of communication channels.

11. A system according to claim 7, wherein the relay station is a satellite for supporting two-way communication between the terminal and the hub, and the terminal is a Very Small Aperture Terminal (VSAT), the communication channel being based on Time Division Multiple Access (TDMA).

12. An apparatus for managing bandwidth in a data network, the apparatus comprising: means for allocating capacity on a communication channel for a terminal to transmit data over the communication channel; and in anticipation of the terminal having to transmit additional data, means for further allocating additional capacity on the communication channel for the terminal, wherein the anticipatory allocation is determined according to loading of the data network, wherein the communication channel is established by a transmission frame, the apparatus further comprising:

means for selectively adjusting, based on the loading, burst size per frame corresponding to the anticipatory allocation.

13. An apparatus according to claim 12, wherein the anticipatory allocation is performed for a predetermined period after the initial allocation, the apparatus further comprising: means for selectively adjusting the predetermined period based on the loading.

14. An apparatus according to claim 12, wherein the terminal is one of a plurality of terminals in the data network, and the allocation of capacity including the additional capacity of the communication channel is provided to the plurality of terminals, the apparatus further comprising:

means for determining available capacity of the communication channel for the anticipatory allocations; and means for limiting the anticipatory allocations to a predetermined level based on the available capacity of the communication channel.

15. An apparatus according to claim 14, wherein the terminal is one of a plurality of terminals in the data network and the data network supports a plurality of communication channels, the apparatus further comprising:

means for determining available capacity across a group of the plurality of communication channels for the anticipatory allocations; and means for limiting the anticipatory allocations to a predetermined level based on the available capacity across the group of communication channels.

16. An apparatus according to claim 12, wherein the data network includes a satellite for supporting two-way communication between the terminal and a hub, and the terminal is a Very Small Aperture Terminal (VSAT), the communication channel being based on Time Division Multiple Access (TDMA).

17. A method for managing bandwidth in a bandwidth constrained two-way radio communication system, the method comprising:

detecting an active terminal in the communication system;

allocating bandwidth on a return channel to receive data from the active terminal in response to the detected active terminal; and providing subsequent bandwidth allocations on the return channel for anticipated traffic from the terminal based on the loading of the communication system, wherein the bandwidth allocations are adjusted according to one of duration of the subsequent bandwidth allocations and size of the bandwidth allocations, selectively adjusting, based on the loading, burst size per frame corresponding to the anticipatory allocation.

18. A computer-readable medium bearing instructions for managing bandwidth in a bandwidth constrained two-way radio communication system, the instructions being arranged, upon execution, to cause one or more processors to perform the following:

detecting an active terminal in the communication system;

allocating bandwidth on a return channel to receive data from the active terminal in response to the detected active terminal; and providing subsequent bandwidth allocations on the return channel for anticipated traffic from the terminal based on the loading of the communication system, wherein the bandwidth allocations are adjusted according to one of duration of the subsequent bandwidth allocations and size of the bandwidth allocations, selectively adjusting, based on the loading, burst size per frame corresponding to the anticipatory allocation.

* * * * *